United States Patent [19]

Dunning et al.

[11] Patent Number: 5,363,907
[45] Date of Patent: Nov. 15, 1994

[54] HOSE COVER AND HOSE ASSEMBLY

[76] Inventors: Dave Dunning, 37894 Lakeville Dr., Mt. Clemens, Mich. 48045; William Cline, 6417 Basswood, Troy, Mich. 48098

[21] Appl. No.: 145,776

[22] Filed: Oct. 29, 1993

Related U.S. Application Data

[63] Continuation-in-part of Ser. No. 890,178, May 29, 1992, Pat. No. 5,287,913.

[51] Int. Cl.$^5$ .................................. F28F 71/06
[52] U.S. Cl. ................................. 165/46; 137/340; 239/139
[58] Field of Search ............. 165/46, 164, 184; 137/340; 239/135, 139

[56] References Cited

U.S. PATENT DOCUMENTS

| | | | |
|---|---|---|---|
| 1,329,268 | 1/1920 | Dickelmann et al. | |
| 2,126,585 | 8/1938 | Stone | 85/21 |
| 2,700,988 | 1/1955 | Smisko | 138/25 |
| 2,756,032 | 7/1956 | Dowell | 257/246 |
| 2,778,609 | 1/1957 | Peers | 165/46 X |
| 2,946,371 | 7/1960 | Stephens et al. | 154/28 |
| 2,978,225 | 4/1961 | Dallas, Jr. | 165/46 |
| 3,333,500 | 8/1967 | Kelsay | 85/49 |
| 3,495,629 | 2/1970 | Botsolas et al. | 138/149 |
| 3,735,769 | 5/1973 | Miller | 137/13 |
| 3,901,269 | 8/1975 | Henderson | 137/340 |
| 3,960,180 | 6/1976 | Andersson | 138/110 |
| 3,960,181 | 6/1976 | Baur | 138/178 |
| 3,973,585 | 8/1976 | Henderson | 137/340 |
| 4,139,026 | 2/1979 | Zack | 138/178 |
| 4,142,565 | 3/1979 | Plunkett, Sr. | 150/52 |
| 4,279,270 | 7/1981 | Francis, Jr. | 137/340 |
| 4,463,780 | 8/1984 | Schultz et al. | 138/178 |
| 4,554,773 | 11/1985 | Conley | 52/521 |
| 4,574,876 | 3/1986 | Crid | 165/46 |
| 4,669,509 | 6/1987 | Botsolas | 138/178 |
| 4,930,543 | 6/1990 | Zuiches | 138/110 |
| 5,269,368 | 12/1993 | Schneider et al. | 165/46 |

FOREIGN PATENT DOCUMENTS

725513  1/1966  Canada .

Primary Examiner—John C. Fox
Attorney, Agent, or Firm—Krass & Young

[57] ABSTRACT

A hose assembly suited for delivering viscous material to a dispenser nozzle at a controlled viscosity and temperature. The hose assembly includes a jacketed hose including an outer hose positioned around an inner hose carrying the mastic and defining an annular passage between the inner hose and the outer hose, and a hose cover assembly adapted to be releasably wrapped around a further remote hose carrying the mastic. The cover assembly includes an elongated strip of flexible material including generally parallel opposite longitudinal edges; a plurality of tubes embedded in the strip and running longitudinally through the strip; and coacting interengagable quick release means (such as a zipper) on the opposite longitudinal edges of the strip to enable the strip to be wrapped around the hose and secured in position around the hose by releasable interengagement of the quick release means.

9 Claims, 6 Drawing Sheets

HOSE COVER AND HOSE ASSEMBLY

RELATED APPLICATION

This application is a continuation-in-part of U.S. Pat. application Ser. No. 890,178, filed on May 29, 1992, now U.S. Pat. No. 5,287,913.

BACKGROUND OF THE INVENTION

This invention relates to a hose cover and a hose assembly utilizing the hose cover.

There are many industrial applications (for example the manufacture of motor vehicles) where it is necessary to provide a bead of viscous adhesive material for application to a surface of a part to facilitate the attachment of the part to other parts. The adhesive bead is typically provided by a system including an adhesive pump supplying adhesive material to a nozzle which may, for example, be mounted on a robot so as to allow the nozzle to be movable by the robot in any desired motion program so as to apply a predetermined pattern of adhesive beading to the part. In order for such systems to operate successfully, it is important that the viscosity of the adhesive bead be carefully controlled at all times so as to provide a desired and preprogrammed flow of the adhesive bead onto the surface of the part. Control of the rate of flow of the adhesive material involves, among other parameters, control of the temperature of the adhesive. Whereas various systems have been proposed to control the temperature of the adhesive flowing between the adhesive pump and the nozzle, the prior art systems are either ineffective to precisely control the temperature and thereby the viscosity of the adhesive and/or are unduly complicated and unduly expensive.

SUMMARY OF THE INVENTION

This invention is directed to the provision of an improved system for delivering viscous adhesive material.

More specifically, this invention is directed to the provision of an improved hose assembly for use in a temperature control system for an adhesive applicator system.

Yet more specifically, this invention is directed to the provision of a novel hose cover assembly for use in a temperature control system for an adhesive applicator system.

The hose cover assembly of the invention comprises an elongated strip of flexible material including generally parallel opposite longitudinal edges; a plurality of tubes embedded in the strip and running longitudinally through the strip; and coacting interengagable quick release means on the opposite longitudinal edges of the strip to enable the strip to be wrapped around a hose and secured in position around the hose by releasable interengagement of the quick release means. This arrangement allows the cover to be readily wrapped around the hose and secured in position to facilitate passage of conditioning fluid through the tubes to condition the material flowing through the hose.

According to a further feature of the invention, the strip is laminar and includes a plurality of layers, and the tubes are positioned between layers of the strip. This arrangement facilitates the positioning of the tubes along the length of the strip. In the disclosed embodiment of the invention, the layers are sewn together to secure the layers together and to define longitudinally extending passages for receiving the tubes.

According to a further feature of the invention, the cover assembly further includes a flap at each end of the strip having a width exceeding the width of the strip so as to allow the flap to be wrapped around the hose with longitudinal edges of the flap overlapping; and quick release means on the longitudinal edges of the flaps to maintain the flaps in a lapped configuration around the hose. This arrangement allows the ends of the cover strip to be neatly cinched around the hose.

According to a further feature of the invention, the assembly further includes means to supply fluid to the tubes for passage through the strip. In the disclosed embodiment of the invention, the supply means includes a manifold associated with the strip and the tube ends are connected to the manifold.

According to a further feature of the invention, the ends of the tubes are selectively joined at one end of the strip to enable the fluid to flow in one direction through the strip through one tube and then reverse direction and flow in the other direction through the strip in another tube. This arrangement allows the fluid to flow from a manifold along the hose, and then back along the hose to the manifold.

The hose assembly of the invention is intended for transporting mastic material from a mastic pump to a dispensing nozzle. The invention hose assembly includes a manifold, a first hose extending from a rearward inlet end adapted to receive the output of the pump and a forward outlet end proximate the manifold, a second hose having a rearward inlet end receiving the output of the first hose and a forward outlet end for connection to the nozzle, and means defining a conditioning fluid path extending from a source of fluid to the manifold, thence forwardly along the second hose to a location proximate the nozzle, thence rearwardly along the second hose to the manifold, thence to the outlet end of the first hose, thence rearwardly along the first hose to the inlet end of the first hose, and thence back to the fluid source. This assembly provides a convenient means of supplying a conditioning fluid to the first and second hoses.

According to a further feature of the invention, the hose assembly further includes a hose cover adapted to be releasably wrapped around the second hose; the hose cover includes tubes positioned longitudinally of the second hose with the cover wrapped around the second hose, and the forward and rearward paths of the fluid along the second hose are defined along the tubes of the hose cover. This arrangement provides a convenient means for defining the fluid paths along the second hose.

According to a further feature of the invention, the hose assembly further includes a jacket around the first hose defining an annular passage extending from the inlet end to the outlet end of the first hose, and the rearward path of fluid along the first hose extends through the annular passage. This arrangement provides a convenient means of passing conditioning fluid over the first hose.

In the disclosed embodiment of the invention, the fluid is arranged to flow from the source to the manifold, thence forwardly along the second hose, thence rearwardly along the second hose, thence rearwardly along the first hose, and thence back to the source. This arrangement allows the fluid to flow along the first hose in a direction counter to the direction of mastic material flowing through the hose so as to optimize heat exchange between the conditioning fluid and the mastic material.

According to a further feature of the invention, the hose assembly further includes an outlet end block at the forward outlet end of the first hose, the forward end of the first hose communicates with the outlet end block, the rearward end of the second hose communicates with the outlet end block, and the fluid path extends from the manifold to the end block and thence through the end block for communication with the annular passage. This end block configuration facilitates the movement of the conditioning fluid through and around the first and second hoses.

In the disclosed embodiment of the invention, the hose assembly further includes an inlet end block at the inlet end of the first hose and the annular passage communicates with the fluid source through the inlet end block.

DETAILED DESCRIPTION OF THE PREFERRED EMBODIMENTS

Figure 1:
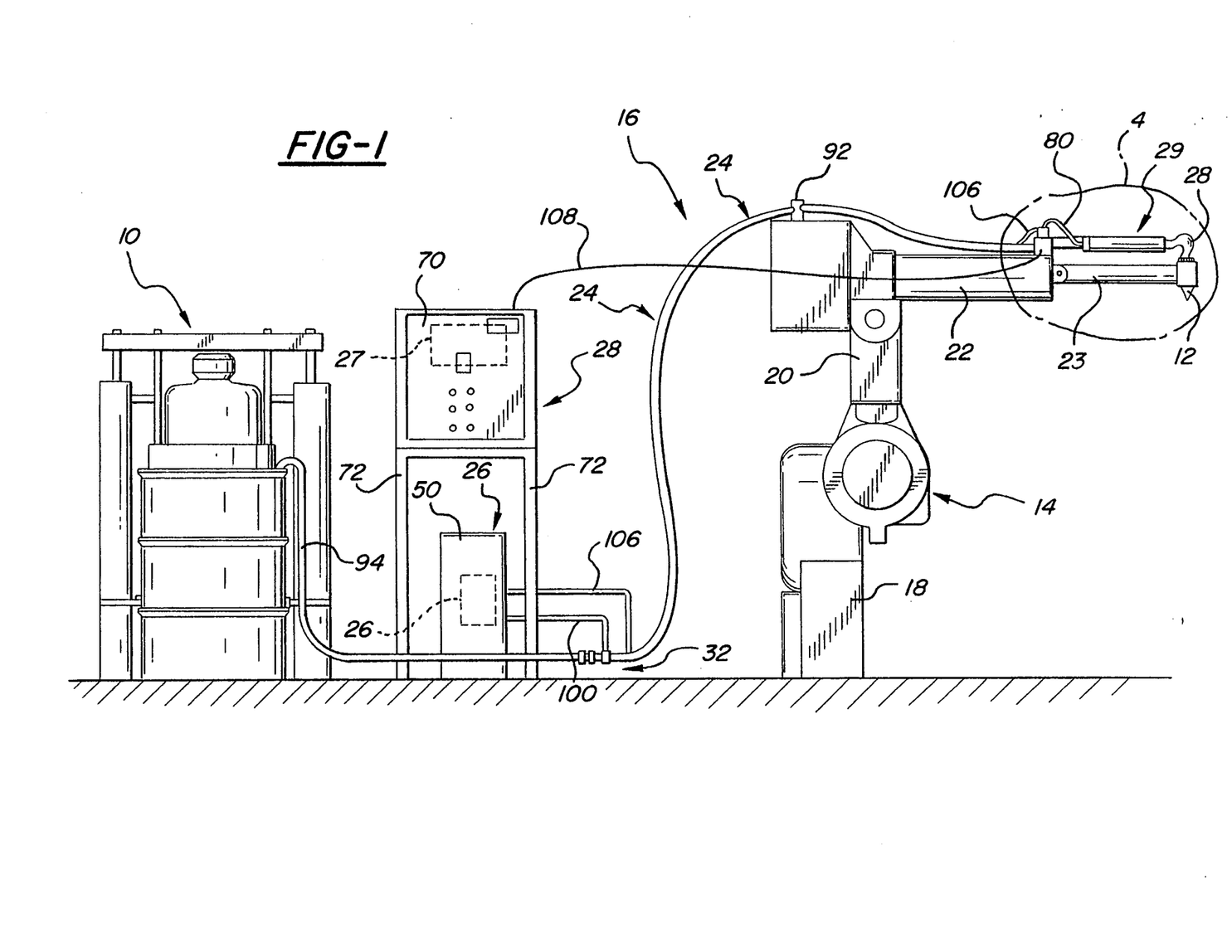
FIG. 1 is a side elevational view of a viscous material applicator system utilizing a hose assembly according to the invention.
Figure 2:
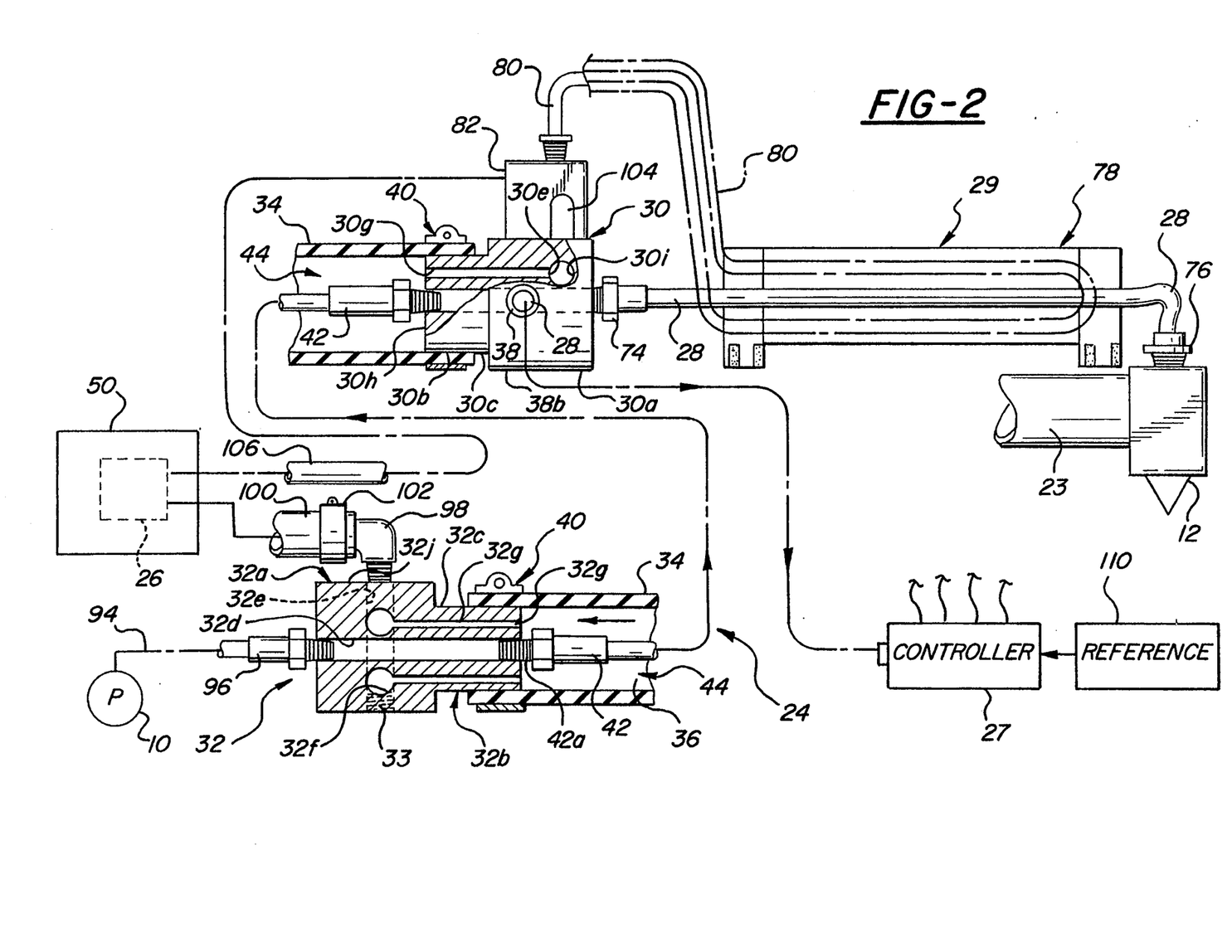
FIG. 2 is a fragmentary somewhat schematic view of the applicator system of FIG. 1.
Figure 3:
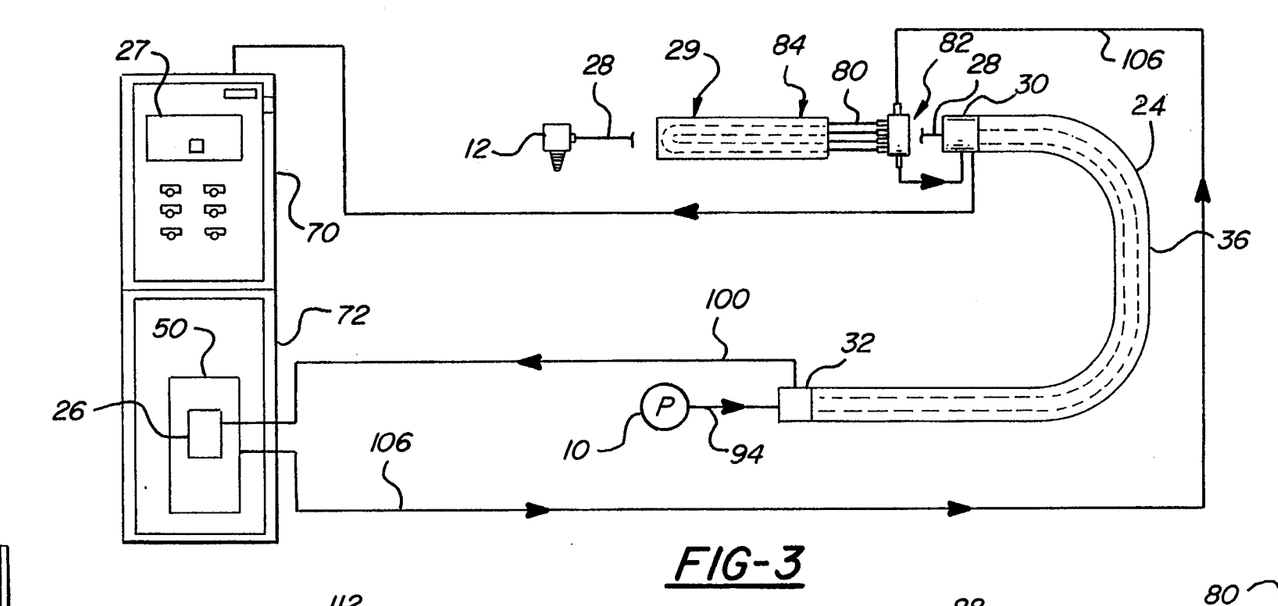
FIG. 3 is a schematic view of the applicator system of FIG. 1.

The viscous material applicator system seen in FIG. 1 includes an adhesive pump 10, a nozzle 12, a robot 14, and a temperature control system 16 for delivering adhesive in a temperature controlled manner from the pump to the nozzle.

Adhesive pump 10 may take various forms and may, for example, comprise an air driven positive displacement, high volume, high pressure, double-acting, suction assisted, double elevator, low shear piston pump of the type available from Johnstone Pump Company of troy, Mich. as 1001 Series. Nozzle 12 is of known form and is operative in known manner to apply a bead of adhesive material to the surface of a part. Nozzle 12 is suitably mounted on robot 14.

Robot 14 is of known form and includes a pedestal 18, a primary arm 20 universally mounted on the pedestal 18, a secondary arm 22 pivotally mounted on the primary arm 20, and a whip arm 23 pivotally mounted on secondary arm 22. Nozzle 12 is mounted on the free end of whip arm 23 so that the robot may be programmed to move the nozzle in a predetermined pattern to apply a bead of adhesive material to a part in a predetermined pattern.

Temperature control system 16 includes a jacketed hose assembly 24, a water conditioner 26, a controller 27, a hose 28 and a hose cover assembly 29.

Figures 4, 8:
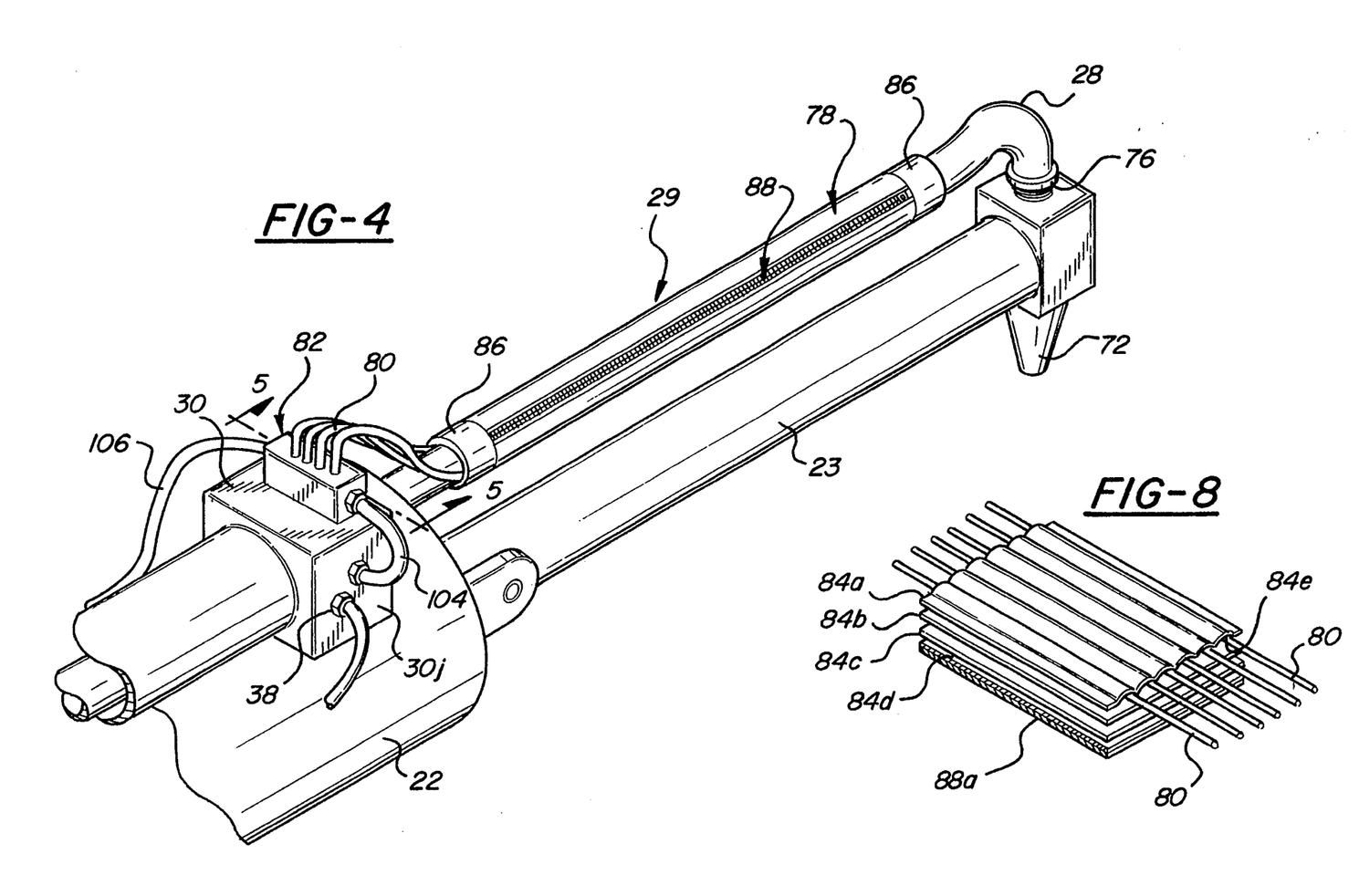
FIG. 4 is a fragmentary perspective view, taken within the circle 4 of FIG. 1, of the invention hose assembly.
FIG. 8 is a fragmentary perspective view showing the construction of the hose cover.
Figure 5:
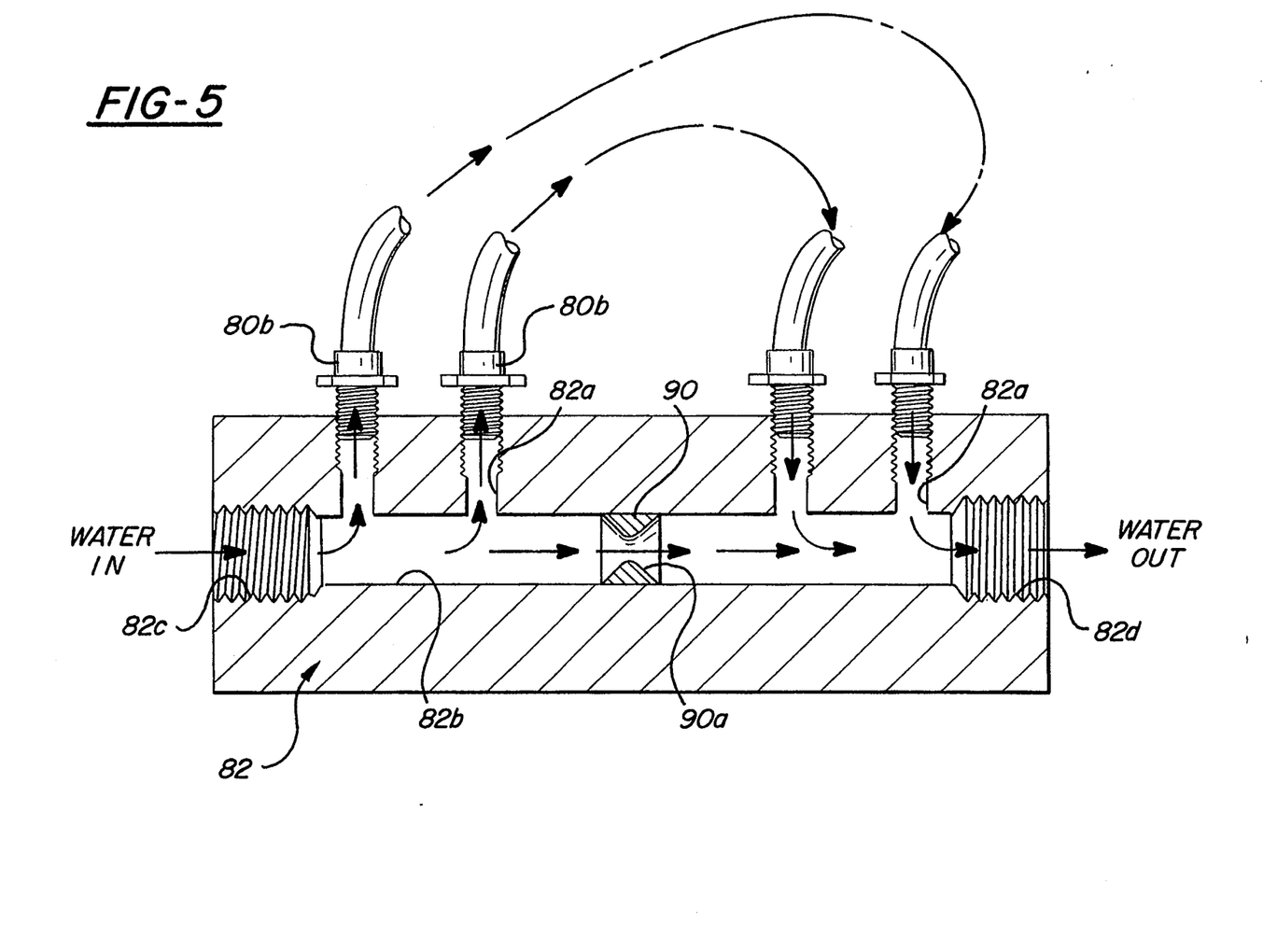
FIG. 5 is a cross sectional view taken on lines 5—5 of FIG. 4.

Jacketed hose assembly 24 includes an outlet end block 30, an inlet end block 32, an outer hose 34, an inner hose 36, and a temperature sensor 38.

End blocks 30 and 32 are formed of a suitable steel material.

Outlet end block 30 includes an outboard portion 30a of square cross section and a reduced diameter inboard portion 30b of circular cross section and defining an annular hose mounting surface 30c. A central through axial bore or passage 30d extends through the end block in concentric relation to the circular inboard end portion 30b with hose mounting surface 30c concentrically surrounding the inboard end of passage 30d. End block 30 further defines a transverse bore 30e and a plurality of axial bores 30g opening at their inboard ends in the inboard face 30h of inboard portion 30b and opening as their outboard ends in bore 30e. A threaded plug plugs one end of bore 30e so that the bores 30e and 30g coact to define heat transfer passage means extending through the block from the inboard ends of the axial bores 30g to the opening 30i of bore 30e in a side face 30j of block portion 30a.

Inlet end block 32 includes an outboard end portion 32a of square cross section; an inboard end portion 32b of circular cross section and defining an annular hose mounting surface 32c; a central through axial bore or passage 32d concentric with respect to surface 32c; a heat transfer passage means including a vertical through bore 32e, transverse bores 32f opening at their inboard ends in vertical bore 32e, and a plurality of circumferentially spaced axial bores 32g opening at their inboard ends in the inboard face 32h of inboard end portion 32b and opening at their outboard ends in vertical bore 32e or in a transverse bore 32f; and threaded plugs 33 plugging the lower end of vertical bore 32e and the outboard ends of transverse bores 32f so that the bores 32e, 32f and 32g coact to define passage means extending through the block from the inboard ends of the axial bores 32g to the opening of the upper end of bore 32e in upper side face 32j of block portion 32a.

Outer hose 34 is formed of a suitable flexible elastomeric material and has a circular configuration. Hose 34 is sized to fit slidably at its opposite ends over the annular surfaces 30c, 32c defined by the inboard end portions of the respective end blocks with hose clamps 40 clamping the ends of the hose 34 to the respective hose mounting surfaces 30c, 32c.

Inner hose 36 is a high pressure hose formed of a suitable flexible reinforced rubber material. A fitting 42 is crimped onto each end of the hose 36 and each fitting 42 includes a threaded portion 42a for threaded engagement in the threaded inboard end of a respective bore 30d, 32d so as to establish fluid communication between the hose 36 and the bores 30d, 32d through the fittings 42.

It will be seen that hose 36 is positioned generally coaxially within outer hose 34 with an annular space 44 therebetween extending through the entire length of the hose assembly and with the inboard end of the heat transfer passage means in end block 30 communicating with one end of annular space 44 and the inboard end of the heat transfer passage means in end block 32 communicating with the other end of annular space 44.

Temperature sensor 38 includes a probe portion extending through a bore in end block 30 to position the inboard tip of the probe portion in passage 30d and a threaded main body portion threaded into block 30. Sensor 38 may comprise a thermocouple of known form and is operative in known manner to generate an electrical signal proportional to the temperature being sensed by the inboard end of the probe.

Water conditioner 26 includes a heater, a chiller, a valve, and a pump (not shown) all positioned within a cabinet 50.

Controller 27 is of known form and may comprise for example a unit available from Omron Corporation os Schaumburg, Ill. as E5EX Series. Controller 27 may be housed for example in a cabinet 70 positioned over water conditioner cabinet 50 and supported by legs 72 straddling water conditioner cabinet 50.

Hose 28 is a high pressure hose formed of a suitable flexible reinforced rubber material with a fitting 74 crimped on one hose end and threadably received in one end of central bore 30d of outlet end block 30 and a fitting 76 crimped on the other hose end and threadably received in dispenser 12 so that hose 28 provides a continuation of the mastic fluid path defined by inner hose 36 of jacketed hose assembly 24.

Figure 6:
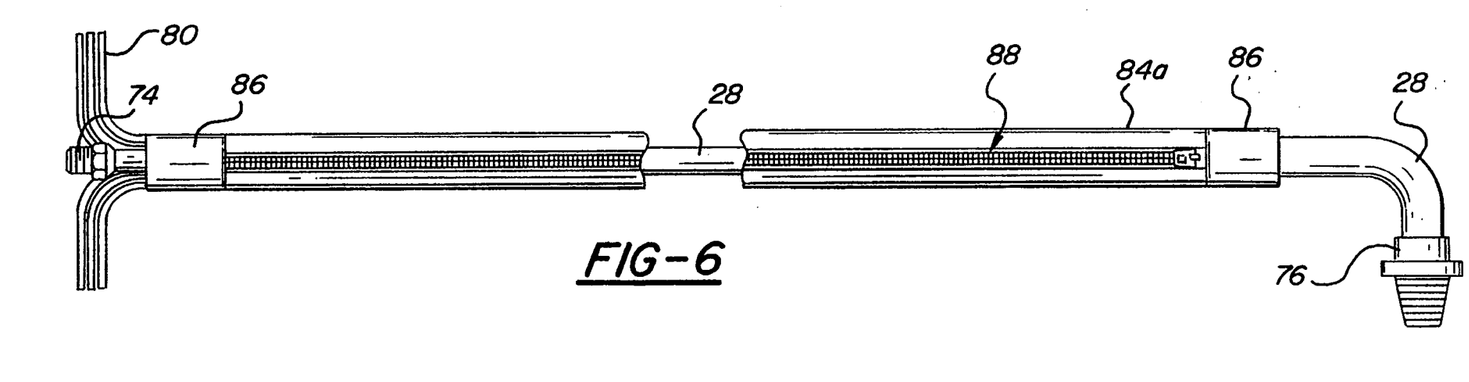
FIG. 6 is a view of a hose cover utilized in the invention hose assembly shown wrapped around a hose.
Figure 7:
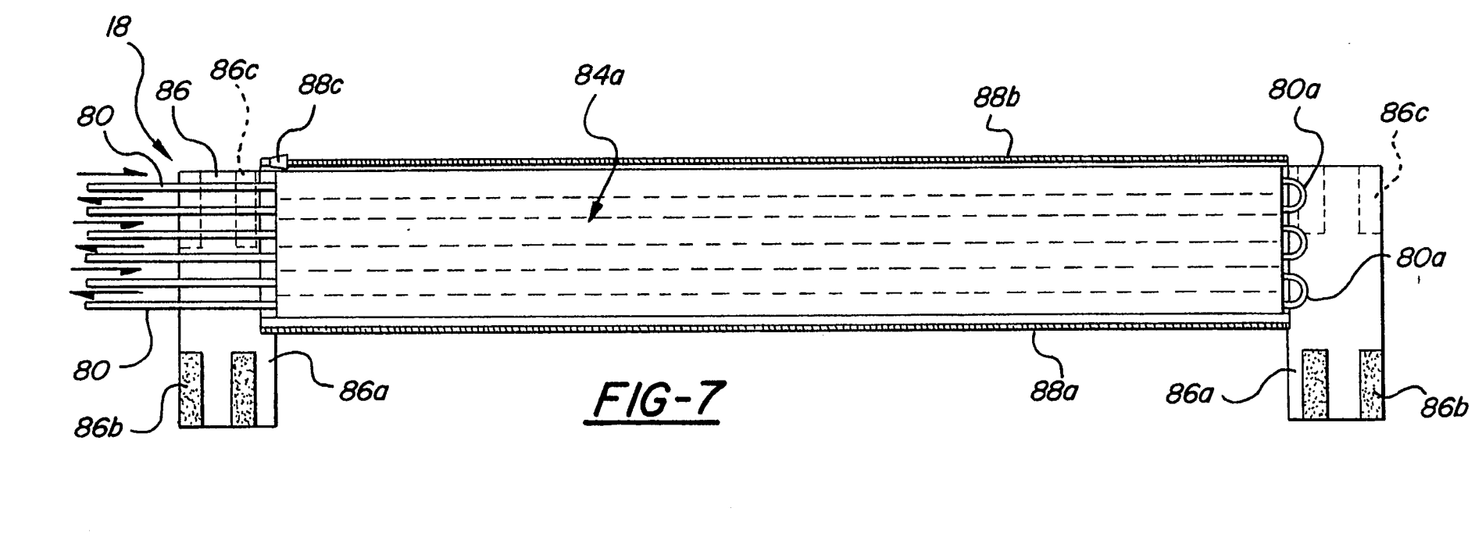
FIG. 7 is a view of the hose cover of FIG. 6 shown in an unwrapped configuration.

Hose cover assembly 29 includes a cover assembly 78, a plurality of tubes 80, and a manifold 82.

Cover assembly 78 includes a plurality of elongated strips of flexible material 84a, 84b, 84c and 84d, and end flaps 86. Strips 84a, 84b, 84c and 84d are arranged one on top of the other in laminar configuration and are suitably sewn together. In the sewing operation, innermost strip 84a and the next adjacent strip 84b are configured to define longitudinally extending passageways 84e to selectively house the tubes 80. Strips 84a, 84b, 84c and 84d may be formed for example of a suitable vinyl backed nylon material. A zipper 88, including a first zipper element 88a secured to one longitudinal edge of outermost strip 84d and a coacting zipper element 88b secured to the other longitudinal edge of outermost strip 84d, enables the cover to be wrapped around hose 28 and secured in position around the hose by interengagement of zipper elements 88a and 88b utility pull tab 88c.

Flaps 86 are suitable secured to the opposite transverse end edges of outermost strip 84d and have a width exceeding the width of strips 84a, 84b, 84c and 84d so as to provide a lap portion 86a. Flaps 86 further include hook and loop quick release elements 86b and 86c of known form so that, following wrapping of the hose cover around hose 28 and zipping of zipper 88 to secure the cover around the hose, flaps 86 may be tightly cinched around the opposite ends of the hose and/or tubes 80 with lap portions 86a overlapping the main body of the flaps and secured in overlapping relation utilizing hook and loop elements 86b, 86c.

Tubes 80 are preferably formed of a suitable flexible plastic material and are respectively received in passageways 84e defined by the sewn together strips 84a and 84b. As best seen in FIG. 7, the far or remote ends of the tubes are preferably selectively joined in pairs utilizing reverse loop hose portions 80a so as to enable conditioning fluid to flow in one direction through the strip through one tube 80 and then reverse direction and flow in the other direction through the strip through an adjacent tube 80. It will be understood that the number of tubes 80 will vary depending upon the particular application envisioned but that typically four, six or eight tubes may be provided so as to provide two, three or four complete loops of forward and reverse flow along the cover.

Manifold 82 includes a plurality of threaded ports 82a adapted to received threaded fittings 80b on the near ends of the tubes 80 so as to enable the tubes to be threadably connected to manifold 82 for communication via bores 82a with a central manifold bore 82b. Manifold 82 further includes threaded bores 82c and 82d at the opposite ends of central bore 82b and a central threaded plug restricter 90 positioned centrally in bore 82b and defining a restricted orifice 90a.

In the assembled relation of the invention hose assembly in the adhesive applicator system of FIG. 1, outlet end block 30 of jacketed hose assembly 24 is suitably secured to the forward end of robot arm 22; hose 28 is connected at one end to nozzle 12 by fitting 28 and is connected at its other end to end block 30 by fitting 74; a clamp 92 mounts an intermediate portion of hose assembly 24 to the rear end of robot arm 22; a pipe 94 extends from the output of pump 10 and is connected to inlet end block 32 by a fitting 96 threaded into the threaded outboard end of bore 32d; a fitting 98 is threaded into the threaded upper end of vertical bore 32e in end block 32; a hose 100 is secured by a clamp 102 to fitting 98 and extends to cabinet 50 for connect to water conditioner 26; manifold 82 is positioned, for example, on top of outlet end block 30a; a hose 104 extends from manifold fitting 82d to the inlet 30i of transverse bore 30e of outlet end block 30; a hose 106 extends from cabinet 50 and along jacketed hose 24 to manifold fitting 82c, a lead 108 extends from sensor 38 to controller 27; tubes 80 are connected by fittings 80b to the respective ports 82a of manifold 82; hose cover 28 is wrapped around hose 28 and held in position around hose 28 utilizing zipper 88; flaps 86 are wrapped around hose 28 at the opposite ends of cover 29 and maintained in position utilizing hook and loop elements 86a, 86b; and tubes 80 extend from manifold 82 and extend longitudinally along the hose cover, in intimate relation to hose 28, through passages 84e in hose cover 29 with the remote ends of the tubes connected by reverse bends 80a so as to provide a plurality of conditioning fluid loop paths extending forwardly along the hose 28 and thence rearwardly along the hose 28 for return to manifold 82.

In operation, adhesive or mastic material is delivered by pump 10 through pipe 94 for delivery to nozzle 12 for suitable application to a surface of a part with the pattern of movement of the nozzle 12, and thereby the pattern of the bead applied by the nozzle 12, being determined by the preprogramming of the robot 14. It will be understood that the adhesive material moves slowly through the system and may, for example, take as long as an hour to move from the pump to the nozzle. As the mastic material moves slowly through the system from the pump to the nozzle, the temperature, and thereby the viscosity of the material, is carefully controlled by the temperature control system 16.

Specifically, the adhesive material moves slowly through pipe 94, fitting 96, passage 32d, fitting 42, inner hose 36, fitting 42, passage 30d, fitting 76, and hose 28 to nozzle 12 for application to the part while the temperature control system operates to maintain a continuous flow of heat transfer fluid (such for example as water) through the system.

Specifically, conditioned temperature controlled fluid flows from water conditioner 26, through hose 106 to manifold 82; flows through manifold central bore 80b for delivery to the manifold ports 82a positioned to the left of restricter 90 as viewed in FIG. 5; flows through outbound tubes 80 and through the strips of cover 29 forwardly along hose 28; and return flows rearwardly through inbound tubes 80 and through the strips of cover 29 for return to central manifold bore 82b via the manifold ports 82a positioned to the right of restricter 90. The fluid returning from the hose cover 29 joins fluid flowing directly through the restricter orifice 90a and flows through hose 104 and into bores 30 and 30g of outlet end block 30 for delivery to annular chamber 44, whereafter the fluid flows through annular chamber 44 along inner hose 36 to inlet end block 32 where it flows through bores 32g, 32f and 32e and through hose 100 for return to water conditioner 26.

Controller 27 looks at a reference desired temperature signal that is provided by a reference unit 110, compares the reference signal to the temperature signal being transmitted to the controller via lead 108 from temperature sensor 38, and generates appropriate control signals for delivery to the water conditioning unit 26 to control the temperature of the water flowing through the system in a manner to maintain the desired adhesive temperature at the nozzle 12.

The temperature at which the water is maintained in the system will of course vary depending upon the desired temperature and viscosity of adhesive material at the nozzle. For example if it is desired to maintain the water temperature in the system at between 70° and 80° (and thereby an adhesive material temperature between 70° and 80°) the heater of the water conditioner may be sized and energized to heat the water delivered to it to 120° F., the chiller of the water conditioner may be sized and energized to cool the water delivered to it to 52° F., and the valve of the water conditioner may be selectively controlled to route water through the chiller and/or the heater in a manner to provide water in the hose 106 set between 70°–80° F. Further details of the manner in which water conditioner 26 and the controller 27 function to maintain the desired temperature of the conditioning fluid flowing through the system are disclosed in applicant's copending U.S. patent application Ser. No. 890,178.

Figure 9:
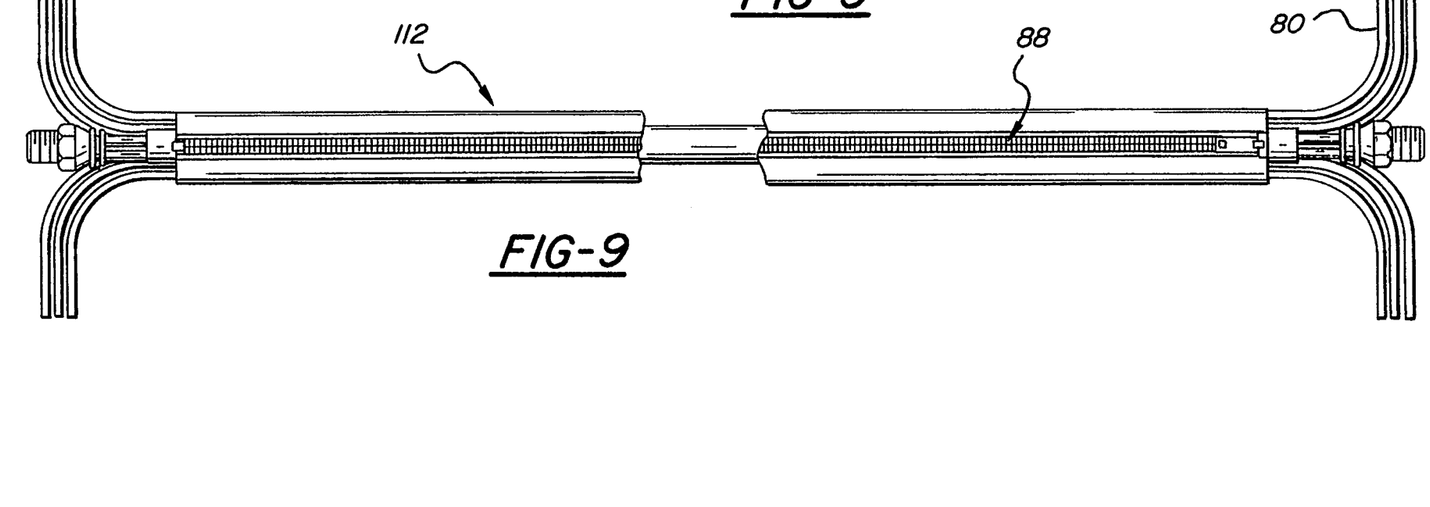
FIG. 9 is a view of an alternate form of hose cover.

A modification of the invention hose cover assembly is seen in FIG. 9. The hose cover assembly 112 of FIG. 9 is identical to the hose cover assembly 29 previously described with the exception that the tubes 80 are not joined at their remote ends by reverse bend tube portions but rather the tubes pass through the strips of the cover in a continuous path with no reverse flow.

The invention will be seen to provide an improved hose cover assembly and an improved hose assembly utilizing the improved hose cover assembly. The invention hose assembly, including the invention hose cover assembly, is simple and inexpensive in construction and is very effective in providing precise temperature control for the heat transfer fluid to thereby provide precise temperature and viscosity control for the adhesive material being delivered to the nozzle. The hose cover assembly specifically provides a ready and efficient means for heating the final hose section of a robotic hose assembly and allows the final hose section to be adequately covered and heated without impeding the continuous whipping action typically imparted to the final arm of the robot in the course of applying the mastic.

Whereas preferred embodiments to the invention have been illustrated and described in detail it will be apparent that various changes may be made in the disclosed embodiment without departing from the scope or spirit of the invention.

We claim:

1. A hose cover assembly comprising:
    an elongated strip of flexible material including generally parallel opposite longitudinal edges;
    a plurality of tubes embedded in the strip and running longitudinally through the strip; and
    coacting interengagable quick release means on said opposite longitudinal edges to enable the strip to be wrapped around a hose and secured in position around the hose by releasable interengagement of the quick release means.

2. A hose cover assembly according to claim 1 wherein:
    the strip is laminar and includes a plurality of layers; and
    the tubes are positioned between layers of the strip.

3. A hose cover assembly according claim 2 wherein:
    the layers are sewn together to secure the layers together and to define longitudinally extending passages for receiving the tubes.

4. A hose cover assembly according to claim 3 wherein:
    the layers are formed of a vinyl backed nylon material; and
    the tubes are formed of a plastic material.

5. A hose cover assembly according to claim 1 wherein:
    the system further includes means to supply a fluid to said tube for passage through said strip.

6. A hose cover assembly according to claim 5 wherein:
    the supply means includes a manifold associated with the strip; and
    one end of each tube is connected to the manifold.

7. A hose cover assembly according to claim 1 wherein:
    the ends of the tubes are selectively joined at one end of the strip to enable the fluid to flow in one direction through the strip through one tube and then reverse direction and flow in the other direction through the strip through another tube.

8. A hose cover assembly according to claim 1 wherein the cover assembly further includes:
    a flap at each end of the strip having a width exceeding the width of the strip so as to allow the flaps to be wrapped around the hose with longitudinal edges of the flaps overlapping; and
    quick release means on the longitudinal edges of the flaps to maintain the flaps in a wrapped configuration around the hose.

9. A hose cover assembly according to claim 1 wherein:
    the coacting interengagable quick release means comprises coacting zipper elements on the opposite longitudinal edges of the strip.

* * * * *